United States Patent [19]

Oikawa et al.

[11] Patent Number: 4,953,528
[45] Date of Patent: Sep. 4, 1990

[54] DIRECT INJECTION-TYPE DIESEL ENGINES

[75] Inventors: Hiroshi Oikawa, Tokyo; Naohisa Nakashima, Kawasaki; Tadaaki Matsuhisa, Kasugai; Tadao Ozawa, Nagoya, all of Japan

[73] Assignees: Mitsubishi Jidosha Kogya Kabushiki Kaisha; NGK Insulators, Ltd., both of Japan

[21] Appl. No.: 417,545

[22] Filed: Oct. 5, 1989

[30] Foreign Application Priority Data

Oct. 7, 1988 [JP] Japan .................... 63-252157

[51] Int. Cl.$^5$ ................................ F02B 3/00
[52] U.S. Cl. .................... 123/276; 123/271; 123/279; 123/285
[58] Field of Search ........... 123/276, 263, 278, 271, 123/285, 281, 279

[56] References Cited

U.S. PATENT DOCUMENTS

| | | |
|---|---|---|
| 4,164,913 | 8/1979 | Komiyama et al. ............. 123/285 |
| 4,221,190 | 9/1980 | Komiyama et al. ............. 123/263 |
| 4,311,122 | 1/1982 | Barba et al. ................. 123/279 |
| 4,497,309 | 2/1985 | Ivanchenko et al. ........... 123/276 |
| 4,511,612 | 4/1985 | Huthar et al. ............... 123/285 |
| 4,771,748 | 9/1988 | Chonela et al. .............. 123/276 |
| 4,834,042 | 5/1989 | Wakasa et al. ............... 123/271 |

*Primary Examiner*—Raymond A. Nelli
*Attorney, Agent, or Firm*—Arnold, White & Durkee

[57] ABSTRACT

A direct injection-type diesel engine includes a piston head formed with a novel piston combustion chamber, with an inner wall surface composed essentially of ceramic material having a low thermal conductivity. The combustion chamber has a reduced opening diameter to enhance a squish air flow out of the clearance space between the piston and the cylinder head, and allows significant reduction of smoke, unburnt hydrocarbon and particulates in the exhaust gas, as well as minimization of thermal loss of the engine.

15 Claims, 4 Drawing Sheets

FIG_1

FIG_4
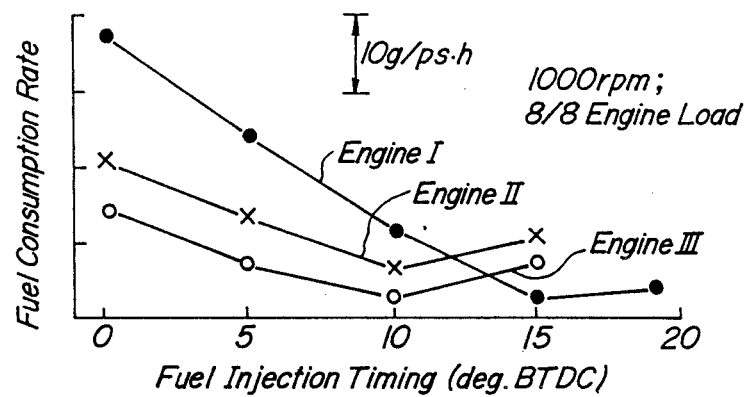
FIG_5
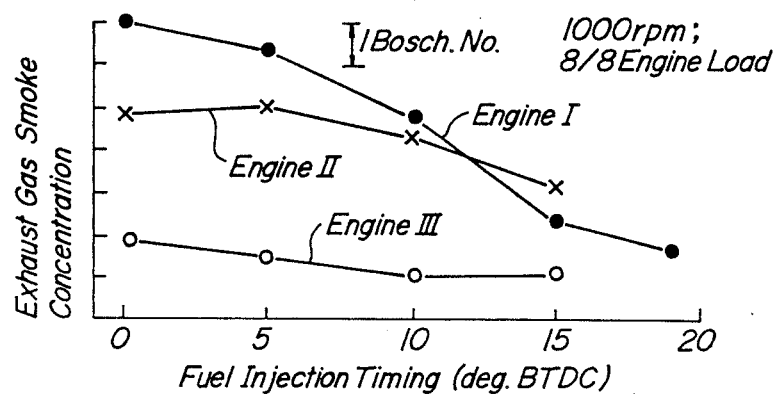

FIG_6
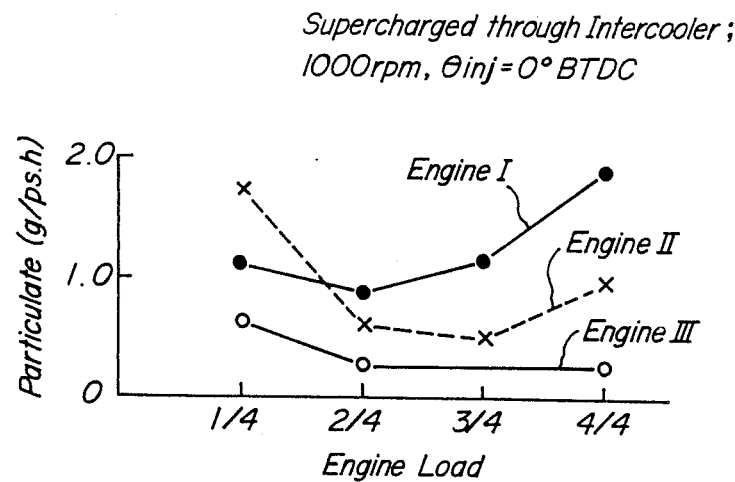

DIRECT INJECTION-TYPE DIESEL ENGINES

BACKGROUND OF THE INVENTION

1. Field of the Invention

The present invention relates to a direct injection-type diesel engine, and more particularly to an improved structure of the combustion chamber which is formed in the piston head.

2. Description of the Related Art

For diesel engines wherein fuel is directly injected into compressed air to achieve the combustion, a major part of the combustion during a heavy load condition is the mixture-rate-determining combustion, so that it has been considered indispensable to efficiently and adequately control the air/fuel mixture ratio in order to improve the engine performance, and to reduce smoke and particulates in the exhaust gas. Based on such a recognition, there has been a proposal to reduce the opening diameter of the combustion chamber in the piston head so as to enhance a so-called squish air flow, which is forced or "squished" out of the clearance space between the piston and the cylinder head due to a sudden decrease in the volume of that space during the compression stroke.

While the utilization of the enhanced squish air flow does contribute to the reduction of the exhaust smoke and particulates to a certain extent, it is still ineffective by itself in reducing the particulates contained in the exhaust gas to the satisfaction of the social demands. Moreover, due to the reduction of the opening diameter of the combustion chamber in the piston head, the fuel mist forced out of the combustion chamber tends to attach onto adjacent wall surfaces, thus accompanying an increase in the amount of unburnt hydrocarbon in the exhaust gas. Furthermore, a higher speed of the air flow often results in a disadvantageous increase in the thermal loss, owing to an enhanced heat transfer from the burnt gas to the combustion chamber and adjacent regions thereof.

SUMMARY OF THE INVENTION

It is therefore an object of the present invention to provide a direct injection-type diesel engine with a novel combustion chamber, which is capable of reducing smoke and particulates in the exhaust gas by utilizing an enhanced squish air flow, of mitigating undesirable increase in the unburnt hydrocarbon and achieving an adequate combustion with a reduced amount of smoke, unburnt hydrocarbon and particulates in the exhaust gas, and of minimizing the thermal loss.

According to the present invention, there is provided a direct fuel injection-type diesel engine comprising: a cylinder with a predetermined bore diameter; a cylinder head on said cylinder; a piston reciprocably arranged in said cylinder and having a piston head which is formed with a combustion chamber, said combustion chamber including an inner wall surface and an opening which is opposed to said cylinder head; as well as a fuel injection nozzle fixedly mounted in said cylinder head for directly injecting fuel into said combustion chamber; said combustion chamber having said opening with a diameter which is 55% or less of said cylinder bore diameter, and having a maximum diameter which is 128% or more of said opening diameter, said inner wall surface being composed essentially of ceramic material.

The above-mentioned arrangement of the present invention provides various advantages, which are as follows.

At the outset, the reduced opening diameter of the combustion chamber in the piston head serves to enhance the squish air flow forced out of the clearance space between the piston and the cylinder head due to a sudden decrease in the volume of that space during the compression stroke, so as to promote the mixing of fuel with air. Moreover, because at least the inner wall surface of the combustion chamber in the piston head is composed essentially of ceramic material having a thermal conductively lower than that of ordinarily piston metal materials, the combustion chamber and its adjacent regions are thermally insulated, so that the combustion gas as well as the surface in contact with the flame are maintained at a higher temperature. The so-achieved higher temperature of the combustion gas effectively promotes an oxidation reaction of carbon particulates, particularly during a later stage of the combustion accompanying a higher oxygen concentration in the combustion region. The promoted mixture of fuel with air due to the enhanced squish air flow, in combination with the variation in the chemical equilibrium state and the reaction rate as a result of a higher temperature, serves to significantly reduce the emission of carbon particulates in the exhaust gas.

Furthermore, although a reduced opening diameter of the combustion chamber in the piston tends to cause the fuel mist to be forced out of the chamber, a higher temperature of the combustion chamber and its adjacent regions due to the use of ceramic material serves to effectively suppress undesirable attachment of the fuel mist onto wall surfaces to reduce emission of unburnt hydrocarbon into exhaust gas. Despite an increase in the heat conductivity of the combustion gas due to a higher speed of the air flow, and hence in the heat quantity transferred from the gas to the wall, thermal loss can still be minimized by a thermal insulation effect of the ceramic material.

In view of the requirements imposed on the heat resistivity and the heat insulating capacity, the combustion chamber wall in the piston head and its surrounding regions are advantageously composed essentially of at least one ceramic material selected from the group consisting of silicon nitride, partially stabilized zirconia, sialon, alumina and silicon carbide.

To maintain the exhaust gas in the combustion chamber at a higher temperature, the ceramic material of the combustion chamber wall, which is to be brought into direct contact with the combustion gas in the chamber, preferably has a heat conductivity of 0.08 cal/cm.s.°C. or less, and more preferably 0.05 cal/cm.s.°C. or less, under the normal operation temperature.

On the other hand, ceramic materials with an excessively low heat conductivity are often subjected to a severe thermal stress. Thus, in the present invention in which the combustion chamber in the piston head has a reduced opening diameter to enhance the squish air flow, accompanying an increased heat conductivity of the combustion gas and a promoted heat transfer from the combustion gas to the combustion chamber wall, the wall surface of the combustion chamber subjected to a severe thermal stress is preferably composed of a ceramic material with a heat conductivity of at least 0.02 cal/cm.s.°C.

Furthermore, when the wall surface of the combustion chamber is composed of a ceramic material with a heat conductivity of at least 0.02 cal/cm.s.°C., it is still possible to advantageously reduce the thermal loss through the cooling system and to thereby maintain the combustion chamber wall at a higher temperature, by arranging a heat insulating element formed of a material with a heat conductivity of 0.02 cal/cm.s.°C. or less, for example a partially stabilized zirconia plate, at a location which is included in a heat transfer passage to the cooling system, but which is not directly exposed to the combustion gas. The heat insulating element may be arranged within the cylinder head, e.g. between the cylinder head main body and the cylinder head plate below the main body. Additionally or alternatively, the heat insulating element may be arranged with the piston, e.g. between the piston main body and the piston head.

The combustion chamber according to the present invention has, as mentioned above, an opening diameter which is 55% or less of the cylinder bore diameter. It has been experimentally found that it is often difficult to achieve a satisfactorily enhanced squish air flow when the combustion chamber opening diameter exceeds of 55% of the cylinder bore diameter. From this viewpoint, the combustion chamber opening diameter of 45% or less of the cylinder bore diameter proved to provide a satisfactory squish air flow.

On the other hand, advantageously, the combustion chamber has an opening diameter of at least 25% of the cylinder bore diameter. It has also been found that, with a combustion chamber opening diameter of less than 25% of the cylinder bore diameter, an excessive amount of fuel tends to be forced out of the piston combustion chamber of a decreased volume near the top dead center, forming regions with an extreme deviation in the air/fuel mixture ratio to deteriorate the combustion.

When the opening diameter of the piston combustion chamber is reduced to enhance the squish air flow, the chamber configuration resembling an axially elongate cylinder is not very suitable because of a decreased air utilization efficiency in the upper and lower regions. For this reason, according to the present invention, the piston combustion chamber has a maximum diameter which is 128% or more of the opening diameter of the piston combustion chamber. It has been found that the maximum diameter of the piston combustion chamber of 150% or more of its opening diameter provides a preferable air utilization efficiency over the entire regions in the combustion chamber.

Moreover, in order to permit a smooth flow of air/fuel mixture along the inner surface of the piston combustion chamber, advantageously, the inner surface of the piston combustion chamber in a region corresponding to its maximum diameter has a radius of curvature of at least 5%, and more preferably at least 7%, of the cylinder bore diameter, as seen in a plane including the center axis of the chamber.

It is on one hand desirable for the upper and lower peripheral edges of the combustion chamber opening to have a certain radius of curvature to preserve thermal and mechanical durability. On the other hand, however, from the viewpoint of achieving a sufficiently enhanced squish air flow, it has been found advantageous when the radius of curvature of the upper and lower peripheral edges is 0.5 mm or less, and more preferably 0.3 mm or less.

In addition to the formation of the piston combustion chamber by ceramic material, a higher temperature can be more effectively achieved when ceramic materials are also used to form other elements of the engine to be brought into contact with the flame, such as piston upper surface, cylinder head lower surface, cylinder liner inner surface in its upper region, and surfaces of suction and exhaust valves. In this case, sintered ceramic elements can be fixedly secured to the piston main body, cylinder head main body or cylinder liner main body by chemical bonding, mechanical connection or cast-in bonding, or by plasma spray or the like ceramic coating.

BRIEF DESCRIPTION OF THE DRAWINGS

FIG. 4 is a graph showing the relationship in various test diesel engines, between the fuel consumption rate and the fuel injection timing;

FIG. 5 is a graph showing the relationship in the test diesel engines, between the exhaust gas smoke density and the fuel injection timing; and FIG. 6 is a graph showing the relationship in the test diesel engines, between the amount of particulates in the exhaust gas and the engine load.

DETAILED EXPLANATION OF THE PREFERRED EMBODIMENT

Figure 1:
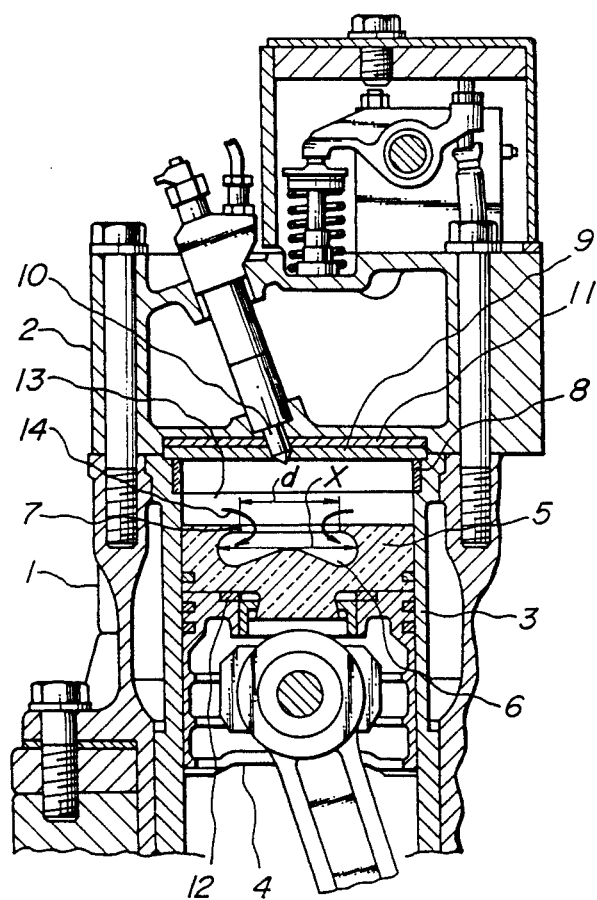
FIG. 1 is a longitudinal-sectional view of the piston combustion chamber in a direct injection-type diesel engine according to one embodiment of the present invention.

The present invention will now be explained in further detail, by referring to the drawings.

Figure 2:
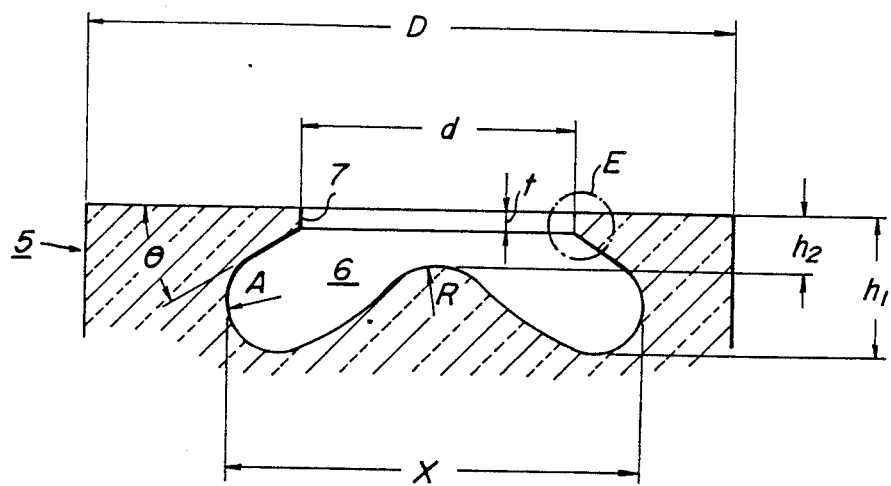
FIG. 2 is a fragmentary enlarged view of the combustion chamber, showing various dimensional parameters thereof.
Figure 3:
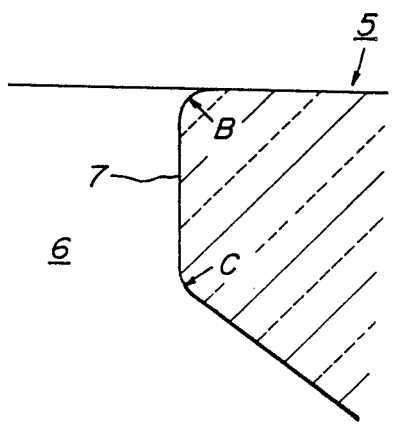
FIG. 3 is a fragmentary enlarged view of the peripheral region E of the combustion chamber opening shown in FIG. 2.

There is shown in FIGS. 1 to 3 a direct injection-type diesel engine according to one embodiment of the present invention, including a cylinder block 1 to which are fixedly secured a cylinder head 2 and a main cylinder liner 3 with a predetermined cylinder bore diameter D. A piston 4 is reciprocably arranged in the cylinder bore, and has a piston head 5 mechanically connected thereto, which is composed essentially of silicon nitride with a heat conductivity at a normal operation temperature of 0.07 cal/cm.s.°C., a density of 3.2 g/cc and a specific heat of 0.17 cal/g.°C.

The piston head 5 is formed with a piston combustion chamber 6 therein, including an inner wall surface and an opening 7 which is opposed to the cylinder head 2. The opening 7 of the piston combustion chamber 6 has a diameter d which is 55% or less, preferably 45% or less and 25% or more, of the cylinder bore diameter D, and also has a maximum diameter X which is 128% or more of the opening diameter d.

An upper cylinder liner ring 8 of ceramic material is arranged within the cylinder block 2, on the upper side of the main cylinder liner 3. A cylinder head plate 9 composed essentially of silicon nitride, which is the same as that used to form the piston head 5, is fixedly arranged between the upper cylinder liner ring 8 and the lower surface of the cylinder head 2. For directly injecting fuel into the piston combustion chamber 6, a fuel injection nozzle 10 is fixedly mounted in the cylinder head 2.

For achieving an effective heat insulation capacity of the combustion chamber 6, according to the illustrated embodiment, a heat insulation plate 11 composed essentially of partially stabilized zirconia with a heat conductivity of 0.007 cal/cm.s.°C. is arranged between the cylinder head 2 and the cylinder head plate 9, while another heat insulation plate 12 of the same partially stabilized zirconia is arranged between the piston 4 and the piston head 5.

By referring to FIGS. 2 and 3, the particulars of one practical example of the diesel engine according to the present invention are shown in the Table 1 below.

TABLE 1

| | |
|---|---|
| cylinder bore diameter D | 130 mm |
| opening diameter d of the combustion chamber | 55 mm |
| max. diameter X of the combustion chamber | 83.2 mm |
| radius of curvature A at the max. diameter region | 9.5 mm |
| thickness t of the combustion chamber opening | 4 mm |
| radius of curvature B, C at the opening edge | 0.3 mm |
| max. depth $h_1$ of the combustion chamber | 27.1 mm |
| depth $h_2^{(1)}$ of the combustion chamber | 11.4 mm |
| radius of curvature $R^{(2)}$ at the bottom center | 15 mm |
| angle $\Theta^{(3)}$ of the combustion chamber inner wall | 30° |

(1) measured from the piston upper surface to the center of the buldge portion on the bottom of the chamber
(2) at the center buldge portion on the bottom of the chamber
(3) angle between the piston top surface and the transient region from the opening to the max. diameter region of the chamber With the diesel engine of the illustrated embodiment having the above-mentioned novel structure of the piston combustion chamber, the piston 4 together with the piston head 5 is caused to move upwardly in the compression stroke of the engine, rapidly reducing the volume of a clearance space 13 between the piston head 5 and the cylinder head plate 9. By this, the air within the space 13 is squeezed therefrom as a squish air flow into the piston combustion chamber 6 through the opening 7, allowing the injected fuel to be effectively mixed with air in the chamber 6. Because the cylinder head 2, the upper region of the cylinder liner 3 and the upper region of the piston 4 are thermally insulated by ceramic elements 11, 8 and 12, respectively, it is possible to efficiently maintain air and combustion gas in the cylinder at a higher temperature. This, in addition to the above mentioned efficient mixing of the fuel with air, serves to suppress formation of carbon particulates and promote an oxidizing reaction of the particulates to minimize emission thereof into the exhaust gas. Furthermore, since the wall surfaces formed by ceramic elements are maintained at a higher temperature, the fuel mist is suppressed from attaching onto the wall surfaces, thereby significantly reducing the emission of unburnt hydrocarbon into the exhaust gas. Moreover, the heat insulation achieved by ceramic elements effectively compensates for a thermal loss as a result of a higher speed of the gas flow.

FIGS. 4 to 6 are graphs showing various functional advantages of the present invention, which were obtained by using the following three kinds of direct injection-type diesel engines I, II and III.

Engine I: Basic diesel engine with a piston combustion chamber formed by metal material, without using ceramic material, the chamber having an unreduced opening diameter of 82.5 mm.

Engine II: Comparative diesel engine with a piston combustion chamber formed of metal material and having a reduced opening and dimensions which are same as those of the above-mentioned practical example.

Engine III: Engine according to the above-mentioned practical example of the invention.

First of all, FIG. 4 shows the relationship between the fuel consumption rate and the fuel injection timing, with the engine speed of 1000 rpm and under a full load condition. The improved fuel consumption rate of the test engine III according to the present invention clearly shows the minimization of the thermal loss achieved by the heat insulation effect of the ceramic elements.

Next, FIG. 5 shows the relationship between the exhaust gas smoke concentration and the fuel injection timing, also with the engine speed of 1000 rpm and under a full load condition. The improved smoke concentration of the test engine III according to the present invention shows that a satisfactory reduction of the smoke, which has been impossible solely by the reduction of the combustion chamber opening and by a resultant enhanced squish air flow, is made possible by the present invention due to an effective utilization of a cumulative effect of the enhanced squish air flow and the higher temperature of the combustion gas.

Finally, FIG. 6 shows the relationship between the amount of particulates in the exhaust gas and the engine load, which has been obtained by initially operating the test engines at a speed of 1000 rpm and at a BTDC 0° under four load conditions to determine the unburnt hydrocarbon concentration and the smoke concentration of the exhaust gas, and subsequently by calculating the amount of the particulates based on the unburnt hydrocarbon concentration and the smoke concentration determined in the initial step. It is clear from FIG. 6 also that a significant reduction of the particulates is achieved by the present invention due to the reasons set fourth with respect to FIG. 5.

The test engine III according to the present invention has a piston combustion chamber with an opening diameter d which is 42.3% of the cylinder bore diameter D, and a maximum diameter X which is 151.3% of the opening diameter d. However, it has also been found that a piston combustion chamber with an opening diameter d which is 50% of the cylinder bore diameter D, and a maximum diameter X which is 128% of the opening diameter d, still provides more favorable performance as compared with the test engines I and II, though slightly inferior when compared with the test engine III.

It will be readily appreciated from the foregoing description that, in the direct injection-type diesel engine according to the present invention, the piston head is formed with a novel piston combustion chamber, having the inner wall surface and its adjacent regions composed essentially of ceramic material with a low thermal conductivity, and a reduced opening diameter to enhance a squish air flow. It is thus possible to achieve a significant reduction of smoke, unburnt hydrocarbon and particulates in the exhaust gas, and minimization of thermal loss of the engine.

What is claimed is:

1. A direct fuel injection-type diesel engine comprising: a cylinder with a predetermined bore diameter; a cylinder head on said cylinder; a piston reciprocably arranged in said cylinder and having a piston head which is formed with a combustion chamber, said combustion chamber including an inner wall surface and an opening which is opposed to said cylinder head; as well as a fuel injection nozzle fixedly mounted in said cylinder head for directly injecting fuel into said combustion chamber; said combustion chamber having said opening with a diameter which is 55% or less of said cylinder bore diameter, and having a maximum diameter which is 128% or more of said opening diameter, said inner wall surface being composed essentially of ceramic material.

2. The diesel engine as claimed in claim 1, wherein said combustion chamber has said opening diameter of 45% or less of the cylinder bore diameter.

3. The diesel engine as claimed in claim 1, wherein said combustion chamber has said opening diameter of at least 25% of the cylinder bore diameter.

4. The diesel engine as claimed in claim 1, wherein said piston combustion chamber has said maximum diameter of 150% or more of its opening diameter.

5. The diesel engine as claimed in claim 1, wherein the wall of the combustion chamber in the piston head and its surrounding regions are composed essentially of at least one ceramic material selected from the group consisting of silicon nitride, partially stabilized zirconia, sialon, alumina and silicon carbide.

6. The diesel engine as claimed in claim 1, wherein the ceramic material of the combustion chamber wall has a heat conductivity of 0.08 cal/cm.s.°C. or less, under the normal operation temperature of the engine.

7. The diesel engine as claimed in claim 6, wherein the ceramic material of the combustion chamber wall has a heat conductivity of 0.05 cal/cm.s.°C. or less, under the normal operation temperature of the engine.

8. The diesel engine as claimed in claim 1, wherein the wall surface of the combustion chamber is composed of ceramic material with a heat conductivity of at least 0.02 cal/cm.s.°C.

9. The diesel engine as claimed in claim 8, wherein a heat insulating element formed of a material with a heat conductivity of 0.02 cal/cm.s.°C. or less is arranged at a location which is included in a heat transfer passage to a cooling system of the engine, but which is not directly exposed to the combustion gas.

10. The diesel engine as claimed in claim 9, wherein said heat insulating element is arranged within the cylinder head, between the cylinder head main body and the cylinder head plate below the main body.

11. The diesel engine as claimed in claim 9, wherein said heat insulating element is arranged within the piston, below the piston head.

12. The diesel engine as claimed in claim 1, wherein said inner surface of the piston combustion chamber has, in a region corresponding to its maximum diameter, a radius of curvature of at least 5% of the cylinder bore diameter, as seen in a plane including the center axis of the chamber.

13. The diesel engine as claimed in claim 12, wherein said inner surface of the piston combustion chamber has, in a region corresponding to its maximum diameter, a radius of curvature of at least 7% of the cylinder bore diameter, as seen in said plane including the center axis of the chamber.

14. The diesel engine as claimed in claim 1, wherein said combustion chamber opening has upper and lower peripheral edges with a radius of curvature of 0.5 mm or less.

15. The diesel engine as claimed in claim 14, wherein said combustion chamber opening has upper and lower peripheral edges with a radius of curvature of 0.3 mm or less.

* * * * *